J. L. Ream,
Corn Harvester.

No. 9487.

Patented Dec. 21, 1852.

UNITED STATES PATENT OFFICE.

JACOB L. REAM, OF MOUNT PULASKI, ILLINOIS.

IMPROVEMENT IN MAIZE-HARVESTERS.

Specification forming part of Letters Patent No. 9,487, dated December 21, 1852.

*To all whom it may concern:*

Be it known that I, JACOB L. REAM, of the town of Mount Pulaski, in the county of Logan and State of Illinois, have invented a new and useful Machine for Harvesting Maize or Indian Corn; and I do hereby declare that the following is a full, clear, and exact description of the construction and operation of the same, reference being had to the annexed drawings, making a part of this specification, in which—

Figure 1:
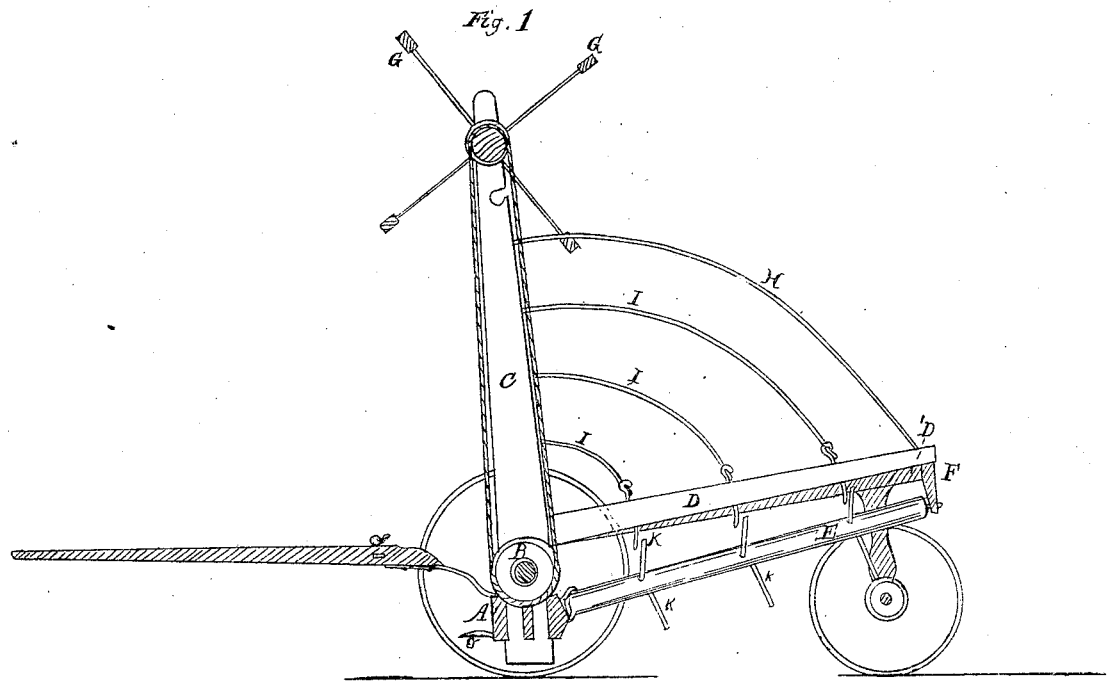
Figure 2:
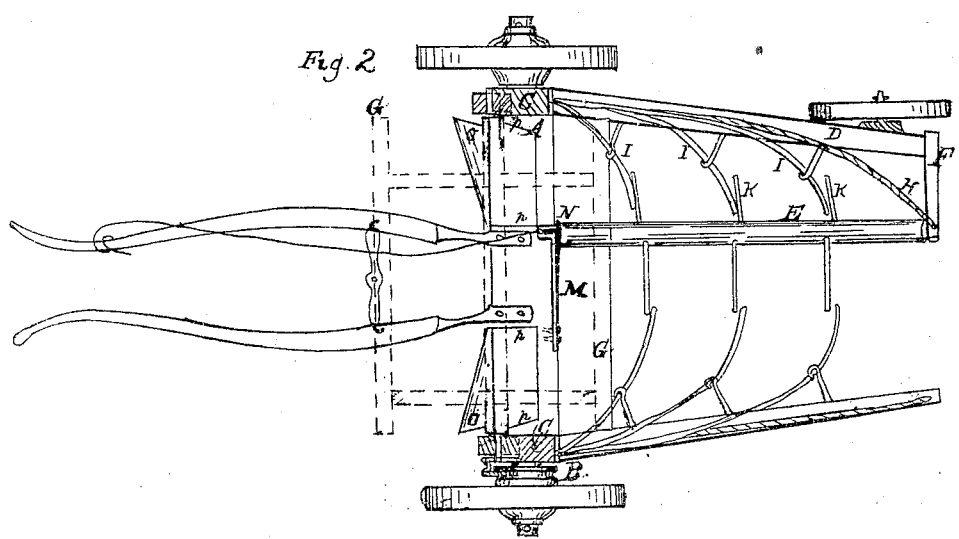

Figure 1 is a side elevation, with one of the wheels removed; Fig. 2, a view from above, exhibiting the plan and, partly in dotted line, the revolving arms and blades.

The nature of the improvement consists in so constructing a machine that by the power of a horse in the shafts propelling the machine forward on wheels across the ridges formed in the last working of the corn and the action of blades or knives affixed to the under side of the axle the stalk will be cut near the ground, the turning blades or reel above the platform on which the cornstalk is received having previously bent it. This platform is formed between beams at right angles to the axle, and composed of bent rods of wood or iron, partially occupying the space, and a rotating shaft with blades or arms filling the remaining space. This shaft is held in check by a ratchet and spring, which, by drawing on a cord, liberates the detent and permits the platform to drop its bundle of stalks as desired, without requiring any mechanical device for turning the shaft or withdrawing the arms thereon, and lays the bundle of stalks on the cornhills, ready for gathering into stacks.

To enable others skilled in the art to make and use my invention, I will proceed to describe its construction and operation.

The machine as constructed is supported on two wheels in front and one supporting the rear end of one of the beams. It is drawn by a pair of shafts, as represented.

A is a cross-piece, which, if low wheels are used, may serve as an axle by being extended. In this machine the wheels are revolved on short axles.

B is a pulley attached to the inside of one of the wheels. Its use is to drive the turning blades or reel G.

C C are uprights on the ends of A, and of sufficient height to carry the reel above the stout part of the cornstalk. A cord connects the pulley on the reel with B.

D' D, are beams inserted at the one end into the uprights C C at a suitable angle, the other ends supported by sufficient rods of iron or wood, H; F, an arm upon one of the beams, D', supporting the revolving shaft E, the inner end of the shaft turning in a journal in A.

I I I are bent rods, inserted in the uprights C C, and, passing through eyes in rods inserted in the beams D D', serve the purpose of cradle-fingers in gathering the stalks on the arms K K K of the revolving shaft E; M, a slap-spring, one end fastening in A, the other provided with a drawing-cord, which may be held in the hand of the boy riding the horse or fastened to the boy's foot; N, a ratchet-wheel affixed on the end of the shaft E.

O O are angular blades, (although I do not confine myself to the shape of the blade,) formed of the best steel, and secured to the under side of A. This cross-piece is thinned down to an edge between $p$ $p$ to permit the stalk to bend over above the blades O O.

The operation as follows: The horse being driven across the ridges between the rows of corn, the blades O, on rising, cut the stalk at an angle not only on the horizontal but vertical line, the turning reel G G having previously bent them backward and held them to the cut. On falling they are directed by the rods I I I and H H upon the arms K K of the turning shaft E. After passing over a suitable number of hills to form a bundle—say eight or ten—upon the shaft E, the cord is drawn by the rider of the horse, the spring liberates the detent N, and the stalks, weighing on the arms K K, turn the shaft and fall with the turn. The next set of arms are brought in place, and so on.

By this machine a vast deal of laborious and, indeed, unpleasant work is saved, as the best time to cut corn is when the dew is on or after a rain.

Having described my improvement, what I claim as my invention, and desire to secure by Letters Patent, is—

The arrangement of the shaft of the receiving-arms K with one end resting upon the cutter-bar piece, thereby dispensing with an intermediate platform, so that the cut stalks will fall directly over the receiving-arms K and be thence discharged in bundles upon the ground, as set forth.

In testimony whereof I have hereunto signed my name before two subscribing witnesses.

JACOB L. REAM.

Witnesses:
W. H. YOUNG,
EZEKIEL BOWMAN.